US008217828B2

(12) United States Patent  
Kirk (10) Patent No.: US 8,217,828 B2  
(45) Date of Patent: Jul. 10, 2012

(54) SYSTEMS AND METHODS FOR GENERATION OF COMPREHENSIVE AIRSPACE WEATHER CONDITION DISPLAY FROM SHARED AIRCRAFT SENSOR DATA BY A TRANSMITTING AIRCRAFT

(75) Inventor: James C. Kirk, Clarksville, MD (US)

(73) Assignee: Honeywell International Inc., Morristown, NJ (US)

( * ) Notice: Subject to any disclaimer, the term of this patent is extended or adjusted under 35 U.S.C. 154(b) by 714 days.

(21) Appl. No.: 12/193,567

(22) Filed: Aug. 18, 2008

(65) Prior Publication Data

US 2010/0328143 A1 Dec. 30, 2010

(51) Int. Cl.
*G01S 13/00* (2006.01)
(52) U.S. Cl. ......................................... 342/62; 342/26 R
(58) Field of Classification Search .......... 340/945–983; 702/3, 144; 342/26, 62–65
See application file for complete search history.

(56) References Cited

U.S. PATENT DOCUMENTS

| | | | |
|---|---|---|---|
| 5,530,909 A | | 6/1996 | Simon et al. |
| 5,913,912 A | | 6/1999 | Nishimura et al. |
| 6,014,606 A | * | 1/2000 | Tu .................................. 701/200 |
| 6,043,756 A | | 3/2000 | Bateman et al. |
| 6,380,869 B1 | | 4/2002 | Simon et al. |
| 6,614,425 B1 | * | 9/2003 | Burdon .......................... 345/418 |
| 6,917,860 B1 | | 7/2005 | Robinson et al. |
| 6,963,291 B2 | | 11/2005 | Holforty et al. |
| 6,977,608 B1 | | 12/2005 | Anderson et al. |
| 7,027,898 B1 | | 4/2006 | Leger et al. |
| 7,053,797 B2 | | 5/2006 | Taylor |
| 7,085,562 B1 | | 8/2006 | Holder et al. |
| 7,471,995 B1 | | 12/2008 | Robinson |
| 7,633,428 B1 | * | 12/2009 | McCusker et al. .......... 342/26 B |
| 2002/0039072 A1 | * | 4/2002 | Gremmert et al. ............ 340/945 |
| 2002/0116125 A1 | * | 8/2002 | Lin ................................ 701/214 |
| 2006/0209090 A1 | * | 9/2006 | Kelly et al. .................... 345/632 |
| 2007/0042773 A1 | | 2/2007 | Alcorn |
| 2007/0042774 A1 | | 2/2007 | Alcorn |
| 2007/0073486 A1 | | 3/2007 | Tillotson et al. |
| 2007/0094528 A1 | | 4/2007 | Fredriksson et al. |
| 2007/0232299 A1 | | 10/2007 | Alcorn |
| 2008/0255714 A1 | | 10/2008 | Ross |

(Continued)

OTHER PUBLICATIONS

Patrick D. McCuster and Eric N. Anderson, Weather Data Aggregation and Display System for Airborne Network of Member Aircraft, U.S. Appl. No. 11/014,118.

(Continued)

*Primary Examiner* — Timothy A Brainard
(74) *Attorney, Agent, or Firm* — Lowe Graham Jones PLLC (57) ABSTRACT

Systems and methods communicate sensor data pertaining to detected weather between aircraft. An exemplary system has at least one sensor on a transmitting aircraft that is configured to detect weather and configured to output sensor data, and a transceiver that is configured to receive a query from a requesting aircraft for the sensor data and that is configured to transmit a signal with the sensor data for receipt by the requesting aircraft in response to receiving the query. Upon receipt by the requesting aircraft, the received sensor data of the transmitting aircraft may then be fused with sensor data of the requesting aircraft for a geographic region of interest to extend the effective sensor coverage and to resolve at least one of a location conflict and a severity conflict between the sensor data of the transmitting aircraft and the requesting aircraft.

17 Claims, 4 Drawing Sheets

U.S. PATENT DOCUMENTS

2009/0134981 A1* 5/2009 Shafaat et al. ............... 340/313
2010/0042275 A1 2/2010 Kirk
2010/0238801 A1* 9/2010 Smith et al. ................ 370/229
2010/0332056 A1 12/2010 Kirk

OTHER PUBLICATIONS

Richard Mamrosh, forecaster, NWS, Green Bay, WI, Aircraft Weather Observations Improve Forecasts, The Front, Jul. 2003, vol. 2, No. 2, pp. 1-7.

H. Paul Stough, III, NASA Langley Research Center, Hampton, Virginia, Aircraft Weather Mitigation for the Next Generation Air Transportation System, pp. 1-6.

Herman A. Rediess, Senior Program Director, National Institute of Aerospace and Sanjay Garg, Chief, Controls and Dynamics Branch, NASA Glenn, Autonomous Civil Aircraft—the Future of Aviation?, Aerospace America, Jul. 2006, pp. 40-43.

Thomas A. Horne, Swapping Data Promises a Simpler Future, Part 2 of 12, AOPA Online: Future Flight: Links to Tomorrow, Feb. 2000, vol. 43, No. 2.

* cited by examiner

SYSTEMS AND METHODS FOR GENERATION OF COMPREHENSIVE AIRSPACE WEATHER CONDITION DISPLAY FROM SHARED AIRCRAFT SENSOR DATA BY A TRANSMITTING AIRCRAFT

CROSS-REFERENCE TO RELATED APPLICATIONS

This application is related to Nonprovisional application Ser. No. 12/193,558 filed Aug. 18, 2008, and entitled SYSTEMS AND METHODS FOR GENERATION OF COMPREHENSIVE AIRSPACE WEATHER CONDITION DISPLAY FROM SHARED AIRCRAFT SENSOR DATA, to James C. Kirk, which is hereby incorporated by reference. This application is also related to Nonprovisional application Ser. No. 12/193,546 filed Aug. 18, 2008, to James C. Kirk, and entitled SYSTEMS AND METHODS FOR GENERATION OF COMPREHENSIVE AIRSPACE WEATHER CONDITION DISPLAY FROM SHARED AIRCRAFT SENSOR DATA BY A RECEIVING AIRCRAFT, which is hereby incorporated by reference.

BACKGROUND OF THE INVENTION

Prior art aircraft radars are capable of detecting weather. The term "weather" generally refers to any types of detectable weather phenomena, such as, but not limited to, storm cells, turbulence regions, clouds, precipitation, hail, snow, icing conditions, wind shear, and the like that an aircraft may encounter. However, the range of the aircraft radar is limited. For example, the radar range for phenomena such as wind shear may be limited to approximately 40 nautical miles. Further, radar is limited to its line of sight. Thus, a radar cannot detect weather beyond blocking objects, such as a mountain. Even if the radar range was unlimited, the radar could not detect beyond the visible horizon.

Figure 1:
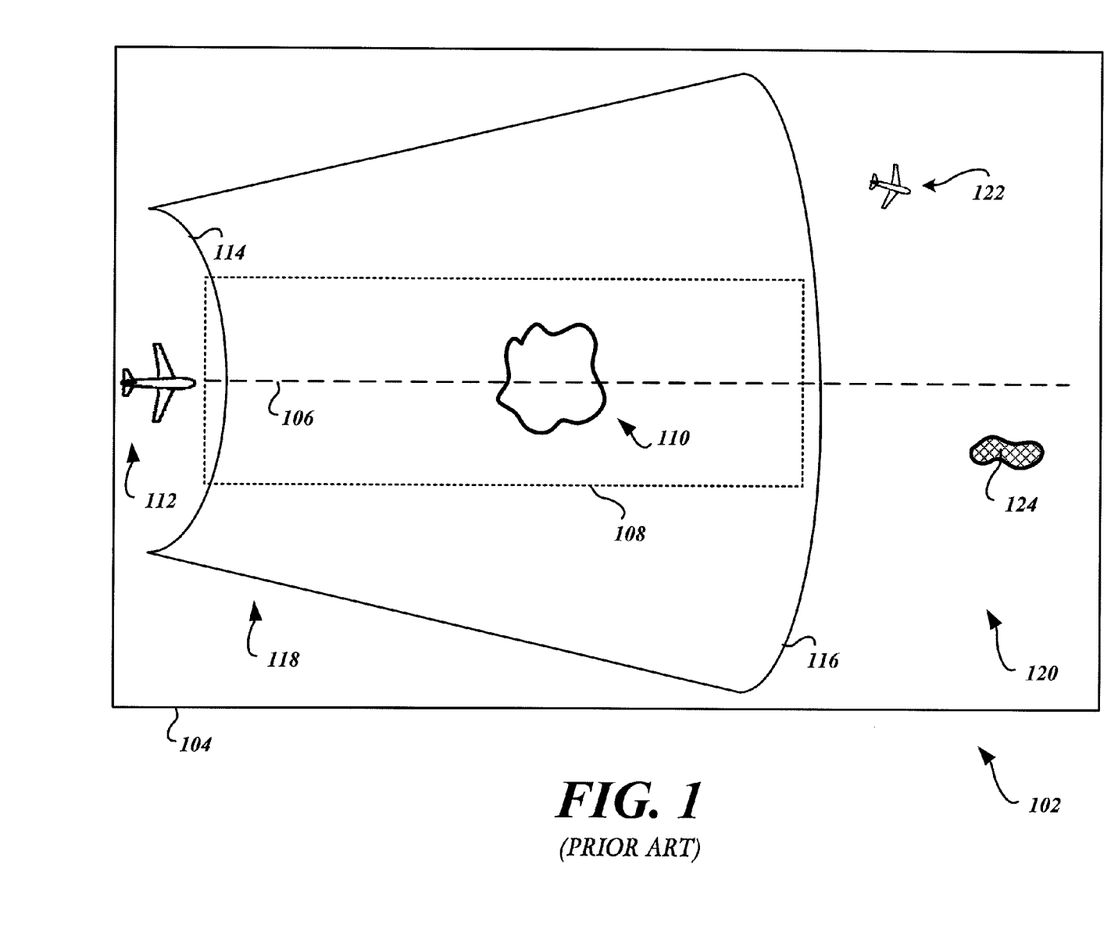
FIG. 1 is a simplified hypothetical plan view display illustrating a radar system display presenting a view of the planned flight path through the region of space.

FIG. 1 is a simplified hypothetical plan view display 102 illustrating a radar system display 104 presenting a view of the planned flight path 106 through the region of space 108. The plan view display 102 indicates presence of a storm cell along the planned flight path 106, as indicated by a presented storm cell icon 110. The relative location of the aircraft is represented by an icon 112, which has the appearance of a generic aircraft. The plan view display 102 also indicates a presented range of the display, bounded by a closer range 114 and a maximum effective range 116. The region 118 corresponds to the effective range and area of coverage of the aircraft's radar system.

The plan view display 102 also presents supplemental information that may be available beyond the aircraft radar maximum effective range 116, as generally denoted by the region 120 on the plan view display 102. For example, an aircraft icon 122 corresponding to a remote aircraft is presented on the plan view display 102. To further illustrate, a turbulence region 124 is also illustrated. Although the remote aircraft corresponding to the aircraft icon 122, and the turbulence region corresponding to the turbulence region icon 124, are out of range from the aircraft radar system, supplemental information for the remote aircraft and the turbulence is available from other sources. For example, a ground station acquires data from other sources, processes the data, and then communicates the supplemental information to the aircraft.

The supplemental information that is provided by the remote ground station that is presented on the radar system display 104 may not necessarily be timely. Some amount of time is required to receive and process the information from ground based radar systems and or pilot reports. However, such supplemental information may be useful to the crew of the aircraft, particularly if they are able take actions to avoid potentially hazardous weather conditions.

The range that the ground station directly covers with its supplemental information may be limited. Additional supplemental information may be provided from other ground stations via communication links, but there may be a further delay in the communication of the supplemental information provided by these more remote ground stations to the aircraft.

Further, in some situations, supplemental information from ground based stations may not be available. For example, information pertaining to areas over large bodies of water, such as an ocean or very large lake, may not be available. Some countries may have large expanses of undeveloped land that is not covered by a ground station.

Accordingly, it is desirable to provide supplemental information to aircraft in situations where no conventional supplemental information is available. Further, where the supplemental information may be available, it is desirable for the aircraft to have more timely supplemental information available.

SUMMARY OF THE INVENTION

Systems and methods that communicate sensor data pertaining to detected weather between aircraft, the merging or combination of the data, and the presentation of the data, are disclosed. An exemplary system has at least one sensor on a transmitting aircraft that is configured to detect weather and configured to output sensor data, and a transceiver that is configured to receive a query from a requesting aircraft for the sensor data and that is configured to transmit a signal with the sensor data for receipt by the requesting aircraft in response to receiving the query. Upon receipt by the requesting aircraft, the received sensor data of the transmitting aircraft may then be fused with sensor data of the requesting aircraft for a geographic region of interest to extend the effective sensor coverage and to resolve at least one of a location conflict and a severity conflict between the sensor data of the transmitting aircraft and the requesting aircraft.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 2:
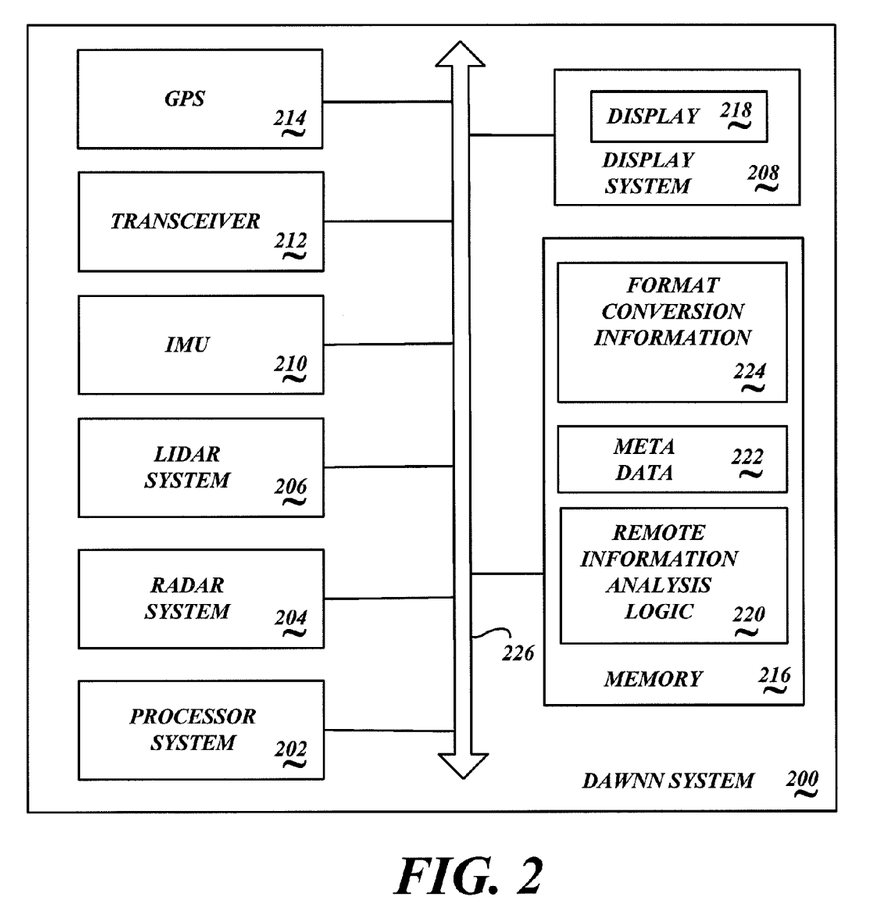
FIG. 2 is a block diagram of an embodiment of a Distributed Aircraft Weather and Navigation Network (DAWNN) system.

FIG. 2 is a block diagram of an embodiment of a Distributed Aircraft and Navigation Network (DAWNN) system 200. The DAWNN system 200 comprises a processor system 202, a radar system 204, an optional light detection and ranging (LIDAR) system 206, a display system 208, an inertial measurement unit (IMU) 210, a transceiver 212, a global positioning system (GPS) 214, and a memory 216. The display system 208 includes a display 218. The remote information analysis logic 220, meta data 222, and format conversion routines 224, reside in portions of the memory 216.

The processor system 202 retrieves and executes the remote information logic 220 to process sensor information received from remote aircraft such that the effective range of the radar system 204 is increased to a virtual radar range. Further, inertial sensor information for remote aircraft may be analyzed by embodiments of the DAWNN system 200. The term "sensor information" as used herein related to information output from a sensing device of the remote aircraft. The output sensor information may be raw data, such as but not limited to radar (volumetric, reflectivity or shear) information, or a processed output from the remote aircraft sensor. In some embodiments, the sensor information from the remote aircraft may have some degree of preprocessing performed prior to communication from the transmitting aircraft.

Embodiments of the DAWNN system 200 may have additional components (not shown) that perform additional functions. Further, in alternative embodiments, various components of the DAWNN system 200 may reside in other locations and/or may be part of other systems. For example, the radar system 204 may be a separate stand-alone system that provides input to the DAWNN system 200. As another non-limiting example, the memory 216 may be a remote memory device that is configured to also store information and transmit information to other devices or systems. Alternatively, or additionally, the memory 216 may be a component of another system to which the DAWNN system 200 is communicatively coupled. Similarly, the transceiver 212 may be a system with a transmitter and a receiver that communicates with other devices. Thus, the transceiver 212 may be a component of another system or reside as a stand-alone system.

The processor system 202, the radar system 204, the optional LIDAR system 206, the display system 208, the IMU 210, the transceiver 212, the GPS 214, and the memory 216, are coupled to a communication bus 226, thereby providing connectivity to the above-described components. In alternative embodiments of the DAWNN system 200, the above-described components may be communicatively coupled to each other in a different manner. For example, one or more of the above-described components may be directly coupled to the processor system 202, or may be coupled to the processor system 202 via intermediary components (not shown).

The received sensor information corresponding to output from one or more sensing devices of the remote aircraft is fused with sensor information of the receiving aircraft to generate a fusion image that is presented on display 218. The fusion process involves various steps or sub processes that are preformed to generate the fusion image. Such steps or sub processes may be performed in an integrated fashion.

The received sensor information corresponding to output from one or more sensing devices of the remote aircraft may cover a very wide and dispersed geographic region. However, the receiving aircraft is only interested in a particular geographic region of interest. For example, the geographic region of interest may correspond to the planned flight path 106. The geographic region of interest may also correspond to contemplated changes to the planned flight path 106, such as when alternative routes around storm cells or congestion areas are considered. Further, the geographic region of interest may be a region that is well beyond the current region of travel of the aircraft 112, such as when the flight crew is considering weather or other conditions in proximity to the destination. Accordingly, the geographic region of interest is defined for the fusion process. The geographic region of interest may be automatically defined or selected by the flight crew of the aircraft 112.

Based upon the defined geographic region of interest, the received sensor information corresponding to the output from one or more sensing devices of the remote aircraft is processed to identify sensor information that is relevant to the geographic region of interest. For example, a storm cell detected by a remote aircraft may or may not lie within the geographic region of interest. Thus, embodiments of the DAWNN system 200 determine if the detected storm cell is relevant to the particular geographic region of interest. If the detected storm cell lies within the geographic region of interest, the sensor information is appreciated to be relevant to the receiving aircraft. Sensor information that is not relevant to the geographic region of interest may be discarded or otherwise ignored.

It is appreciated that when a sensor detects an object, the location of the detected object is known only approximately to the detecting aircraft because of inherent inaccuracies of the information from the GPS 214 and IMU 210. When a plurality of different sensors, each on different aircraft, are detecting the same object, there may likely be conflicts in the determined location of the common object. Accordingly, multiple icons, or targets, corresponding to the detected common object may be presented on the display 218 when the location of the common object is based only on individual sensors. Further, communication delay times associated with receipt of the sensor data by the receiving aircraft may further result in location errors, or increase the location error, for the common object.

For example, two aircraft may detect the same storm cell. However, when presented on the display 218, two individual targets may be presented on the display 218 with would imply presence of two storm cells. Such errors in presentation of the sensor information may cause confusion, and is therefore undesirable.

Accordingly, embodiments of the DAWNN system 200 compare received sensor information from the remote sources, and/or its own sensors, and "deconflicts" the sensor information. For a common object, which may have different determined locations based upon the individual sensors, the remote analysis information logic 220 determines a common location for the detected common object, thus resolving the conflicting location information. Accordingly, a single icon or target for the common object is presented on the display 218.

Embodiments of the DAWNN system 200 may also perform a registration function on the received sensor information to coordinate alignment and color of the icons of a detected common object. It is appreciated that the sensor information received from remote aircraft may indicate a different level of severity for a detected common object. Thus, even after conflicts in the location of the commonly detected object has been resolved, the severity levels associated with the common object may be different. Accordingly, severity information is analyzed and a severity level is determined for the common object. Accordingly, the colors indicating the severity or other characteristic for the common object will be properly presented on the display 218.

For example, severity of a detected storm cell may be construed differently by different aircraft. In view that the sensor information received from remote aircraft may indicate different levels of severity for the same detected storm cell, the remote analysis information logic 220 determines a common severity level, or color, for the detected storm cell, thus resolving the conflicting severity information. Accordingly, a coordinated color of the icon for the common storm cell is presented on the display 218.

Figure 3:
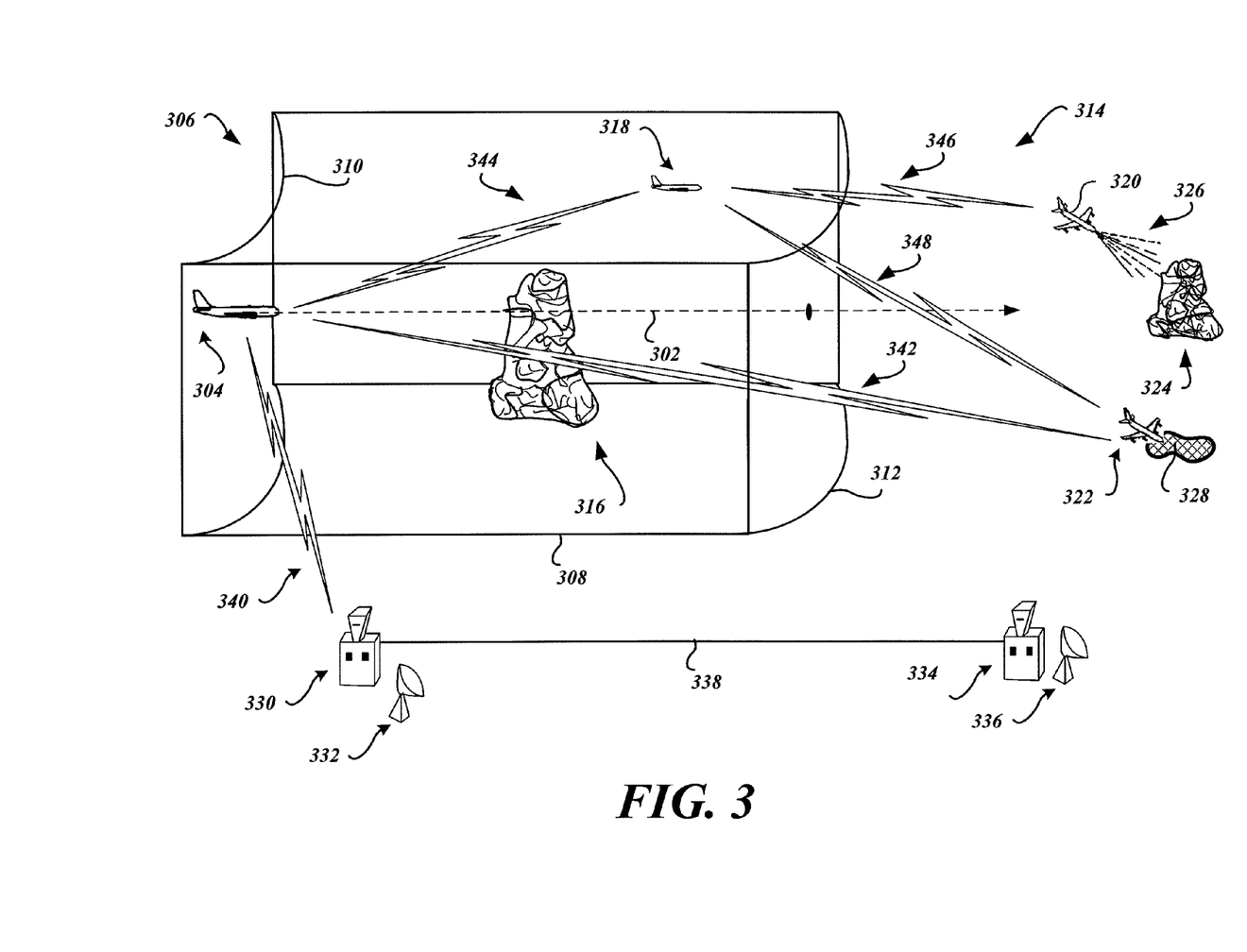
FIG. 3 is a perspective view of a portion of a planned flight path of an aircraft through a region of space.

FIG. 3 is a perspective view of a portion of a planned flight path 302 of an aircraft 304 through a region of space 306. As noted above, the radar system 204 (FIG. 2) of the aircraft 304 is limited in its effective range, as denoted by the region 308, which is bounded by a range 310 closest to the aircraft 304, and a radar range limit 312. Accordingly, weather and/or objects in a geographic area of interest 314 beyond the radar range limit 312 can not be detected by the radar system 204.

In this simplified example, a storm cell 316 and a first remote aircraft 318 are within the radar range limit 312, and are therefore detectable by the radar system 204 of the aircraft 304. However, in this simplified example, a second remote aircraft 320 and a third remote aircraft 322 are in the geographic area of interest 314 that is beyond the effective range of the radar system 204. The second remote aircraft 320 is approaching a second storm cell 324. Radar signals 326 emanating from the second remote aircraft 320 conceptually illustrate that its radar system (not shown) is detecting the second storm cell 324. Also, the third remote aircraft 322 is entering a turbulence region 328 (conceptually illustrated as a cross-hatched region). IMUs of the third remote aircraft 322 will detect the turbulence region 328.

A ground station 330 and a ground radar 332 are illustrated below the aircraft 304. For this simplified example, an assumption is made that the ground radar 332 does not have sufficient range to detect the second remote aircraft 320, the third remote aircraft 322, the second storm cell 324, and/or the turbulence region 328 which also lie beyond the effective range of the radar system 204. However, another ground station 334 and another ground radar 336 are assumed to be within effective radar range to detect the second remote aircraft 320, the third remote aircraft 322, the second storm cell 324, and/or the turbulence region 328.

As noted above, information detected by the ground radar 336 corresponding to the second remote aircraft 320, the third remote aircraft 322, the second storm cell 324, and/or the turbulence region 328, is relayed to the ground station 330, via a communication link 338. The relayed information may then be communicated from the ground station 330 to the aircraft 304, via an uplink signal 340. However, the processed information may not be received by the aircraft 304 in a timely manner.

Embodiments of the DAWNN system 200 are configured to communicate sensor information between aircraft. For example, with reference to FIG. 3, the IMU 210 of the third remote aircraft 322 will detect the turbulence associated with the turbulence region 328. The IMU 210 may include one or more accelerometers and/or one or more gyroscopes (not shown). Output from the IMU 210 is processed by the processor system 202 of the third remote aircraft 322 to determine characteristics of the encountered turbulence region 328. For example, the determined characteristics may include the location and/or severity of the turbulence region 328.

The DAWNN system 200 causes the transceiver 212 of the third remote aircraft 322 to directly broadcast the output of the IMU 210, via communication signal 342. Communication signals communicated between aircraft equipped with embodiments of the DAWNN system 200 may include any type of signal communicated using any suitable communication media and/or format.

The communicated data output from the IMU 210 of the third remote aircraft 322 is received by the aircraft 304, assuming that the two aircraft 304, 322 are in within communication range of each other. The processor system 202 of the receiving aircraft 304 process the received IMU output. Accordingly, in this example, turbulence detected by the exemplary third remote aircraft 322 is substantially immediately available to the receiving aircraft 304. Thus, the receiving aircraft 304 has effectively extended the range of its own IMU by distances corresponding to the location of transmitting aircraft. That is, the receiving aircraft 304 has a virtual IMU in that it is receiving sensor information for the IMU 210 of the remote transmitting aircraft.

In the event that the receiving aircraft 304 and the second remote aircraft 320 are not within communication range of each other, intervening aircraft, such as the first remote aircraft 318, may relay the communicated output of the IMU 210 of the second remote aircraft 320 to the receiving aircraft 304. Here, the first remote aircraft 318 receives the communicated output of the IMU 210 of the third remote aircraft 322, via communication signal 348. The first remote aircraft 318 then relays, such as by re-transmitting, the received output of the IMU 210 of the third remote aircraft 322 to the receiving aircraft 304, via communication signal 344.

Further, in this simplified example, the second remote aircraft 320 is assumed to be out of communication range of the aircraft 304. The radar system 204 of the second remote aircraft 320 detects the storm cell 324. The processor system 202 of the second remote aircraft 320 processes the received information from its radar system 204 and presents information corresponding to the storm cell 324 on its own display 218. Because the storm or weather cell is viewed from two or more aspects, all participating aircraft now have a better view of the extent of storm or weather data over the extended area (assuming that the aircraft mutually exchange information).

Since the second remote aircraft 320 is equipped with an embodiment of the DAWNN system 200, the output from the radar system 204 of the second remote aircraft 320 is communicated to the first remote aircraft 318, via a communication signal 346. The first remote aircraft 318 then relays the received output of the radar system 204 of the second remote aircraft 320 to the receiving aircraft 304, via the communication signal 344.

When the receiving aircraft 304 receives the communication signal 344 having the received output of the radar system 204 of the second remote aircraft 320, and/or having the received output of the IMU 210 of the third remote aircraft 322, the processor system 202 of the receiving aircraft 304 processes the received supplemental information. The received supplemental information is fused with the sensor information of the receiving aircraft 304 and/or with sensor information received from other remote aircraft to resolve location and/or severity conflicts. The supplemental information may then be presented on its own display 218.

When sensor information is communicated to other aircraft by embodiments of the DAWNN system 200, the communication includes the meta data 222 along with the communicated sensor data. Included in the meta data 222 is the location of the transmitting aircraft at the time of transmission of the data and/or at the time the data was received from the sensors. Location data may be provided based on the GPS 214 and/or the IMU 210. The meta data 222 may also include time information indicating the time that the transmitting aircraft transmitted the data and/or the time that the data was received from the transmitting aircraft's sensors. The meta data 222 may also include information pertaining to the characteristics of the transmitting aircraft, such as, but not limited to, aircraft speed, direction, size, weight, etc. Also, the meta data 222 may include information describing the planned flight path of the transmitting aircraft.

Some embodiments of the DAWNN system 200 communicate current sensor outputs to other aircraft. Alternatively, or additionally, stored sensor data may be transmitted. The stored sensor data may be time stamped and/or location stamped so that the receiving aircraft can determine when and/or where the sensor data was accumulated by the transmitting aircraft.

Embodiments of the DAWNN system 200 may retain sensor data for a predefined time period. Sensor data older than the time period may be discarded to make room in the memory 216, or another suitable memory storage medium, for the current sensor data. To limit the amount of information transmitted from an aircraft, the aircraft may discard the sensor data older than the time period.

In some embodiments, to limit the processing of supplemental information, or to limit the supplemental information that is presented on the display 218, the receiving aircraft may discard and/or disregard the sensor data older than the time period. In some embodiments, a current time may be compared with the time of the acquired sensor data or the transmitting time, and if over a time threshold, the sensor information may not be presented, may be discarded or disregarded, or presented in a manner that indicates that the presented sensor data is relatively old. For example, a fill color, fill pattern, or a brightness/intensity of the weather icon may be used to indicate that the presented sensor data is relatively old.

The time periods of historical sensor data communicated from the transmitting aircraft may be different from the time periods used by the receiving aircraft for presenting supplemental information. Further, the time periods may be adjustable depending upon the circumstances of the aircraft. For example, longer time periods may be used for flight over the ocean or when travelling through remote areas with few other aircraft. The time period may be relatively short when travelling through areas with a high aircraft population density, such as a large city.

Figure 4:
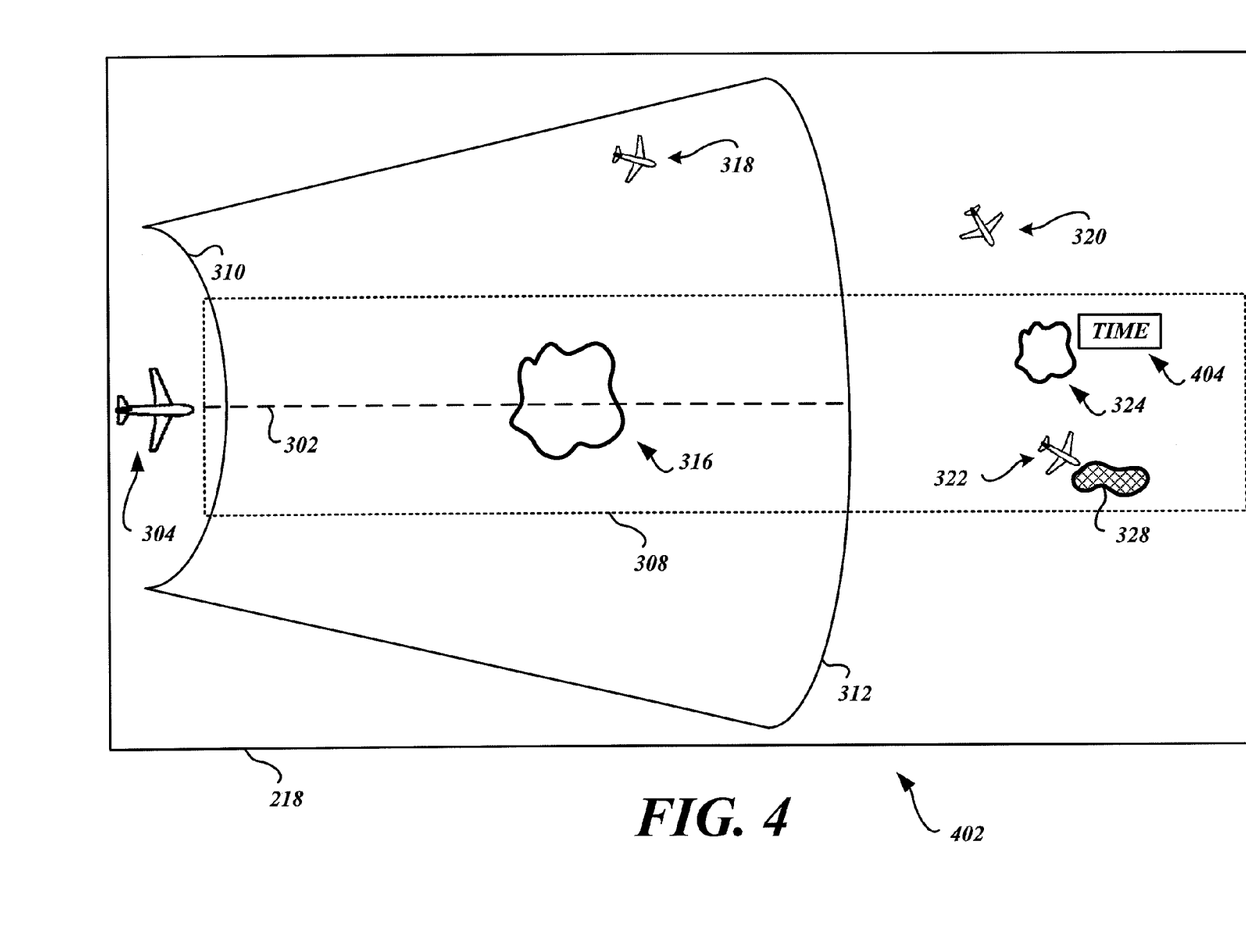
FIG. 4 is a simplified hypothetical fusion image presented on a display.

FIG. 4 is a simplified hypothetical fusion image 400 presented on the display 218 as a plan view display 402. The planned view display optionally presents a view of the planned flight path 302 through the region of space 306. Icons corresponding to the aircraft 304, 318, 320 and 322 illustrated in FIG. 3 are presented on the display 218. Also, icons corresponding to the storm cells 316, 324 and the turbulence region 328 illustrated in FIG. 3 are presented. As noted above, conflicts in the location and/or severity are resolved such that a single icon, with a color corresponding to a resolved severity level, for the storm cells 316, 324 and the turbulence region 328 is presented on the display 218.

For convenience, the reference numerals of the aircraft icons 304, 318, 320, 322, the storm cell icons 316, 324, and the turbulence region icon 328 are the same as the reference numerals used to identify the aircraft 304, 318, 320, 322, the storm cells 316, 324, and the turbulence region 328 of FIG. 3. An icon can be of fixed shape and/or size. Additionally, an icon can depict an arbitrarily shaped area with a distinctive pattern, color, and/or boundary that corresponds to the actual size of the weather-related phenomenon.

The storm cell icon 316 shape, size, and location are determined from the radar system 204 of the aircraft 304. The location of the first remote aircraft 318 may also be determined from the radar system 204 of the aircraft 304. However, the second remote aircraft 320, the third remote aircraft 322, the storm cell 324, and the turbulence region 328 (FIG. 3) are out of range of the radar system 204 of the aircraft 304. Accordingly, embodiments of the DAWNN system 200 determine the location and/or size of the presented storm cell icon 324 and the turbulence region icon 328 based upon supplemental information received from communicated sensor data of the second remote aircraft 320 and the third remote aircraft 322.

Since the meta data 222 communicated with the sensor data includes location information for the transmitting aircraft, the DAWNN system 200 may determine, or at least approximate, the location of the second remote aircraft 320 and the third remote aircraft 322. Since range information from the second remote aircraft 320 may be used to determine the distance between the storm cell 324 and the second remote aircraft 320, and since location information for the second remote aircraft 320 is known, the DAWNN system 200 can compute the location of the second remote aircraft 320 and the storm cell 324. Thus, the weather information is presented on the display 218 of the receiving aircraft 304 at a location on the display 218 corresponding to the relative location of the storm cell 324.

Since the third remote aircraft 322 actually encountered the turbulence region 328, thereby generating sensor output from its IMU 210, and since location information for the third remote aircraft 322 is known, the DAWNN system 200 can compute the location of the third remote aircraft 322 and the turbulence region 328. Thus, the weather information is presented on the display 218 of the receiving aircraft 304 at a location on the display 218 corresponding to the relative location of the turbulence region 328.

Further, since the meta data 222 communicated with the sensor data includes time information corresponding to the sensor information provided by the transmitting aircraft, the DAWNN system 200 may determine, or at least approximate, times that the sensor data was collected. In some embodiments, the DAWNN system 200 may present a time stamp, and/or present other suitable alpha numeric textual indicia, that indicates the time, or an approximate time, that the sensor data was collected. In some embodiments, the icon fill color, pattern, and/or brightness/intensity may be used to indicate the elapsed time or age of the sensor data. Accordingly, a flight crew member of the receiving aircraft 304 may appreciate the "freshness" of the presented data determined from the sensor data.

When many aircraft are equipped with embodiments of the DAWNN system 200, a receiving aircraft may receive a plurality of signals with sensor data from a plurality of transmitting aircraft. Based upon its planned flight path 302, the receiving aircraft determines location of the weather from the received signals, and then selects the sensor data to determine weather information of interest that lies along the planned flight path 302, and/or any anticipated routes of deviation. Thus, the processor system 202 is configured to process many received signals with sensor data, and select the relevant sensor data based on its planned flight path 302. Other received sensor data not pertinent to the planned flight path 302 may be disregarded or discarded.

Some embodiments may limit presentation of remote aircraft sensor data based upon the time information included in the received meta data 222. That is, if a determined elapsed time of the sensor information has become too old to be relevant, or has become too old to be reliable, the DAWNN system 200 will not present information on its display 218 determined from the sensor data received from remote aircraft. The time information included in the received meta data 222 may be compared with a predefined time threshold to determine an elapsed time.

In some embodiments, an elapsed time threshold may be adjustable. For example, but not limited to, the elapsed time threshold may be adjusted based upon the planned flight path 302. If the planned flight path 302 is over an ocean where little to no other sources of supplemental information is available, then the elapsed time threshold may be set to a relatively long time period. In contrast, if the planned flight path 302 is over a densely traveled flight corridor where many sources of supplemental information is available, such as from other aircraft and/or ground stations, then the elapsed time threshold may be set to a relatively short time period. In some embodiments, the elapsed time threshold may be adjustable by the flight crew.

Embodiments of the DAWNN system 200 may be configured to also present supplemental information received from prior art sources. Thus, the crew of the aircraft may adjust the presentation scale of the display 218 well beyond the radar range limit 312 of its radar system 204. Thus, information identifying an aircraft of interest that is located well beyond the radar range limit 312 may be available to the aircraft 304.

In some embodiments, the meta data 222 may include information that uniquely identifies the transmitting aircraft. For example, a flight number, a registration number, or other identifier may be used to identify a transmitting aircraft. This unique identifier may be used in a query based embodiment of the DAWNN system 200.

In a query-based embodiment of the DAWNN system 200, the aircraft 304 may query other remote aircraft of interest for sensor information. For example, the flight crew of the aircraft 304 may know that a remote aircraft of interest equipped with the DAWNN system 200 is near its own planned flight path 302 at a location of interest that is well beyond the range of its own radar system 204. As noted herein, meta data 222 may include a unique identifier for each aircraft equipped with the DAWNN system 200. Accordingly, the aircraft 304 may issue a query to the remote aircraft of interest. The query would include the unique identifier of the remote aircraft of interest. Further, the query may include a request for specific sensor information. If the aircraft issuing the query is not within communication range of the remote aircraft of interest, then the query may be relayed to the remote aircraft of interest by other intervening aircraft, and/or by one or more ground stations or other suitable communication system.

Upon receipt of a query, the remote aircraft of interest may broadcast its supplemental information for receipt by the aircraft issuing the query. If the aircraft issuing the query is within communication range of the remote aircraft of interest, then the supplemental information containing the meta data 222 and the sensor data may be directly received by the aircraft issuing the query. If the aircraft issuing the query is not within communication range of the remote aircraft of interest, then the supplemental information containing the meta data 222 and the sensor data may be relayed to the aircraft issuing the query by other intervening aircraft. Alternatively, or additionally, if the aircraft issuing the query is not within communication range of the remote aircraft of interest, then the supplemental information containing the meta data 222 and the sensor data may be relayed to the aircraft issuing the query via one or more ground stations or another suitable communication system. For example, a telephony system, an internet system, a satellite system, and/or a microwave system, are nonlimiting examples of communication systems that may be used to relay supplemental information, and/or the query itself, between the aircraft issuing the query and the remote aircraft of interest. Further, combinations of communication systems may be used.

It is appreciated that sensor data output by the radar system 204 and the IMU 210 may be different between aircraft equipped with embodiments of the DAWNN system 200. In some embodiments, the received sensor data is formatted into a predefined format for communication by the processor system 202 of the aircraft transmitting the sensor data based upon information in the format conversion routines 224. Thus, the sensor data from aircraft equipped with some embodiments of the DAWNN system 200 may communicate their sensor data using a predefined or selected communication format.

Additionally, or alternatively, the sensor data may be formatted to a data format used by a particular system of the receiving aircraft, referred to herein as a receiving aircraft (RA) format. In some embodiments, the RA format requests may be included in a received query such that the communicated sensor data is formatted in accordance with the RA format specified in the received query.

In other embodiments, the meta data 222 includes sufficient information pertaining to the type of sensor that generated the sensor data. Thus, the receiving aircraft will be able to reformat the received sensor data to be compatible with its various systems. For example, the meta data 222 may include the format conversion routines 224 of the transmitting aircraft describing the received sensor data of the transmitting aircraft. Thus, the processor system 202 of the receiving aircraft 304 may reformat the received sensor data by retrieving and executing the format conversion routines 224.

Alternatively, or additionally, the meta data 222 may identify the sensor generating the sensor data by part number, model number, or another suitable identifier, such that the receiving aircraft can process the received sensor data based upon the format conversion routines 224 stored in its own memory 216. For example, a plurality of format conversion routines 224 corresponding to a plurality of different types of sensors may be stored in the memory 216. Once the particular sensor used by the transmitting aircraft is known, then the aircraft 304 retrieves the format conversion routine 224 for that particular sensor type, and then reformats the received sensor data to be compatible with its own systems.

In the various embodiments, transmitting aircraft equipped with embodiments of the DAWNN system 200 are configured to communicate sensor data to other receiving aircraft. The sensor data may be communicated from the transmitting aircraft continuously, on a periodic basis, and/or in response to a received query. In some embodiments, a signal with only the meta data 222 may be communicated from the transmitting aircraft. The meta data only signal may be transmitted continuously or on a periodic basis. Such meta data 222 may optionally include a description of the available sensor data that may be communicated in response to a query. Aircraft 304, upon consideration of the meta data, may then transmit a query directed to a particular remote aircraft.

In the various embodiments, transceiver 212 (FIG. 2) is a communication device or system configured to receive and transmit radio frequency (RF) signals. It is appreciated that any suitable transceiver device or system may be used, and that the transceiver 212 may have a variety of components therein which are not described or illustrated herein for brevity. For example, but not limited to, the transceiver 212 may include as components a receiver and a transmitter device or system. Further, such components themselves may be separate devices or systems.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for communicating sensor data pertaining to detected weather between aircraft, the method comprising:
storing previously acquired sensor information and a time that the previously acquired sensor information was acquired;
receiving a query from a requesting aircraft;
in response to receiving the query, determining an elapsed time corresponding to a difference between a current time and the time that the previously acquired sensor information was acquired;
in response to the elapsed time being less than an elapsed time threshold, transmitting the signal comprising the previously acquired sensor data from the transmitting aircraft;
in response to the elapsed time being equal to or greater than the elapsed time threshold, currently acquiring sensor information from at least one sensor configured to sense weather, the at least one sensor residing in a transmitting aircraft, wherein the currently acquired sensor information is output from the sensor; and
in response to receiving the query, transmitting a signal comprising the currently acquired sensor information from the transmitting aircraft.

2. The method of claim 1, wherein the transmitted signal further comprises a time identifying acquisition of the sensor information.

3. The method of claim 1, further comprising:
in response to the elapsed time being greater than the elapsed time threshold, discarding the stored previously acquired sensor information.

4. The method of claim 1, wherein the sensor data comprises sensor information acquired from a radar system.

5. The method of claim 1, wherein the sensor data comprises sensor information acquired from an inertial measurement unit (IMU).

6. The method of claim 1, wherein the received query includes a requested sensor data format, and further comprising:
formatting the sensor information into the requested sensor data format; and
in response to receiving the query, transmitting the signal comprising the sensor data in the requested sensor data format.

7. The method of claim 1, wherein the received query includes an aircraft identifier, and further comprising:
comparing the aircraft identifier with an identifier of the transmitting aircraft; and
in response to the aircraft identifier corresponding to the identifier of the transmitting aircraft, transmitting the signal comprising the sensor data.

8. The method of claim 1, further comprising:
formatting the sensor data into a standard sensor data format.

9. The method of claim 1, further comprising:
periodically transmitting the sensor data.

10. The method of claim 1, wherein the transmitted signal further comprises a location of the transmitting aircraft.

11. The method of claim 1, further comprising:
periodically transmitting a periodic signal, the periodic signal including a unique identifier that identifies the transmitting aircraft, and wherein transmitting the signal comprising the sensor data from the transmitting aircraft occurs only in response to the received query that includes the unique identifier of the transmitting aircraft.

12. The method of claim 1, wherein transmitting the signal comprising the currently acquired sensor information from the transmitting aircraft further comprises:
transmitting raw data acquired from the at least one sensor.

13. The method of claim 12, wherein transmitting the signal comprising the currently acquired sensor information from the transmitting aircraft further comprises:
transmitting an identifier of the at least one sensor.

14. A system for communicating sensor data pertaining to detected weather between aircraft, comprising:
at least one sensor on a transmitting aircraft, the at least one sensor configured to detect weather and configured to output sensor information;
a transceiver on the transmitting aircraft configured to receive a query from a requesting aircraft for the sensor information;
a memory configured to store previously acquired sensor information and a time that the previously acquired sensor information was acquired; and
a processor system on the transmitting aircraft, wherein the processor system is communicatively coupled to the at least one sensor, the memory and the transceiver, wherein the processor is configured to:
determine an elapsed time corresponding to a difference between a current time that the query is received and the time that the previously acquired sensor information was acquired;
in response to the elapsed time being less than an elapsed time threshold, transmit a signal comprising the previously acquired sensor data for receipt by the requesting aircraft; and
in response to the elapsed time being equal to or greater than the elapsed time threshold, currently acquire sensor information from at least one sensor in response to receiving the query, and transmit the signal with the currently acquired sensor information for receipt by the requesting aircraft.

15. The system of claim 14, wherein the query includes an aircraft identifier, and wherein the processor system is further configured to compare the aircraft identifier with an identifier of the transmitting aircraft, and configured to cause the transceiver to transmit the signal comprising the sensor information in response to the aircraft identifier corresponding to the identifier of the transmitting aircraft.

16. A system for communicating sensor data pertaining to detected weather between aircraft, the method comprising:
a means for acquiring sensor information from at least one sensor configured to sense weather data residing in a transmitting aircraft, wherein the sensor information is an output of the sensor;
a means for storing previously acquired sensor information and a time that the previously acquired sensor information was acquired;
a means for determining an elapsed time corresponding to a difference between a current time and the time that the previously acquired sensor information was acquired; and
a means for receiving and transmitting signals, wherein the means for receiving and transmitting signals is configured to receive at the current time a query from the requesting aircraft, wherein in response to receiving the query the means for receiving and transmitting signals transmits the signal with the previously acquired sensor information in response to the elapsed time being less than an elapsed time threshold, and wherein in response to receiving the query the means for receiving and transmitting signals is further configured to transmit the signal with the currently acquired sensor information in response to the elapsed time being equal to or greater than the elapsed time threshold.

17. The system of claim 16, wherein the received query includes a requested sensor data format, and further comprising:
a means for formatting the currently acquired sensor information into the requested sensor data format, wherein the means for receiving and transmitting signals transmits the signal with the currently acquired sensor information in the requested sensor data format.

* * * * *